(12) United States Patent
Chou

(10) Patent No.: US 7,693,513 B2
(45) Date of Patent: Apr. 6, 2010

(54) METHODS AND APPARATUS FOR TRANSFERRING SERVICE FLOW CONTEXT OF MOBILE BROADBAND WIRELESS ACCESS NETWORKS

(75) Inventor: Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 11/038,752

(22) Filed: Jan. 18, 2005

(65) Prior Publication Data
US 2006/0160536 A1 Jul. 20, 2006

(51) Int. Cl.
*H04W 4/00* (2006.01)

(52) U.S. Cl. ............... 455/418; 455/419; 455/420; 455/436; 455/561

(58) Field of Classification Search ............. 455/432.1, 455/432.3, 435.1, 435.2, 435.3, 452.2, 414.1, 455/436–442, 418–420, 561
See application file for complete search history.

(56) References Cited

U.S. PATENT DOCUMENTS

| | | | | |
|---|---|---|---|---|
| 5,873,035 | A * | 2/1999 | Ladden et al. | 455/436 |
| 6,295,452 | B1 * | 9/2001 | Choi | 455/436 |
| 6,879,830 | B1 * | 4/2005 | Vollmer et al. | 455/442 |
| 7,042,855 | B1 * | 5/2006 | Gilchrist et al. | 370/328 |
| 2002/0159411 | A1 * | 10/2002 | Airy et al. | 370/330 |
| 2002/0164988 | A1 | 11/2002 | Vishwanathan et al. | |
| 2003/0084129 | A1 * | 5/2003 | Nakamura et al. | 709/220 |
| 2003/0211843 | A1 * | 11/2003 | Song et al. | 455/411 |
| 2004/0053619 | A1 * | 3/2004 | Kim et al. | 455/445 |
| 2004/0063429 | A1 * | 4/2004 | Igarashi et al. | 455/436 |
| 2004/0203788 | A1 * | 10/2004 | Fors et al. | 455/439 |
| 2004/0224690 | A1 * | 11/2004 | Choi et al. | 455/436 |
| 2005/0076112 | A1 * | 4/2005 | Ravindran et al. | 709/224 |
| 2005/0094663 | A1 * | 5/2005 | Rahman et al. | 370/466 |
| 2005/0119001 | A1 * | 6/2005 | Watanabe | 455/436 |
| 2006/0039313 | A1 | 2/2006 | Chou et al. | |
| 2006/0092931 | A1 * | 5/2006 | Walter et al. | 370/389 |
| 2007/0196074 | A1 * | 8/2007 | Jennings et al. | 386/46 |

FOREIGN PATENT DOCUMENTS

WO PCT/US2006/000480 1/2006

OTHER PUBLICATIONS

IEEE, Air Interface for fixed broadband wireless access systems, STD, Jun. 2004, 9-10, 33, 69,138-139, 190, 218, 249, 257-265, 265, 283-285, 730-735, 802.16, IEEE, New York, USA.
IEEE, Handoff Draft, IEEE, Mar. 13, 2003, 0-21, 802.16, Runcom Ltd., Rishon Lezion, Israel.
Peter Drake, Using SNMP to manage networks, Intelligent Networks, LTD., Feb. 1-4, 1991.

* cited by examiner

*Primary Examiner*—Charles N Appiah
*Assistant Examiner*—Jaime M Holliday
(74) *Attorney, Agent, or Firm*—Schwabe, Williamson & Wyatt, P.C.

(57) ABSTRACT

Embodiments of methods and apparatus for transferring service flow context are generally described herein. Other embodiments may be described and claimed.

14 Claims, 7 Drawing Sheets

```
wmanBsSsRegistrationTrap NOTIFICATION-TYPE
        OBJECTS        {wmanIfBsSsTrapMacAddr,
                        wmanIfBsSsRegisterStatus,
                        wmanIfBsOldBsId}
        STATUS         current
        DESCRIPTION
            "An event to report MSS registration status."
        ::=    { wmanIfBsTrapDefinitions 7 }
```

```
wmanBsSsHandoffReqTrap NOTIFICATION-TYPE
      OBJECTS        {wmanIfBsSsTrapMacAddr,
                      wmanIfBsSsRegisterStatus,
                      wmanIfBsTargetBsId}
      STATUS         current
      DESCRIPTION
            "An event to report handoff request Trap."
      ::=   { wmanIfBsTrapDefinitions 8 }
```

METHODS AND APPARATUS FOR TRANSFERRING SERVICE FLOW CONTEXT OF MOBILE BROADBAND WIRELESS ACCESS NETWORKS

TECHNICAL FIELD

The present disclosure relates generally to wireless communication systems, and more particularly, to methods and apparatus for transferring service flow context of mobile broadband wireless access networks.

BACKGROUND

The 802.16 family of standards were developed by the Institute of Electrical and Electronic Engineers (IEEE) to provide for fixed, portable, and/or mobile broadband wireless access (BWA) networks (e.g., the IEEE std. 802.16, published 2004). The Worldwide Interoperability for Microwave Access (WiMAX) forum facilitates the deployment of broadband wireless networks based on the IEEE 802.16 standard. In particular, the WiMAX forum ensures the compatibility and inter-operability of broadband wireless equipment. For convenience, the terms "802.16" and "WiMAX" may be used interchangeably throughout this disclosure to refer to the IEEE 802.16 suite of air interface standards.

The WiMAX technology may support multimedia applications with multiple wireless connections characterized by quality of service (QoS) parameters. For example, the 802.16 family of standards provide packet classifiers to map the multiple wireless connections with user applications and/or interfaces such as an Ethernet network, an Internet protocol (IP) network, an asynchronous transfer mode (ATM) network, a virtual local area network (VLAN), etc. To establish the multiple wireless connections of broadband services for a mobile subscriber station, service flow context such as service flow, QoS, classifier, and/or other suitable parameters may need to be provided and/or transferred during initial registration and/or handoff of the mobile subscriber station.

DETAILED DESCRIPTION

In general, methods and apparatus for transferring service flow context are described herein. According to one example embodiment, service flow context associated with a mobile subscriber station may be identified. The service flow context may be transmitted to a base station. Accordingly, the mobile subscriber station may be managed via a proxy agent associated with the base station. The methods and apparatus described herein are not limited in this regard.

Figure 1:
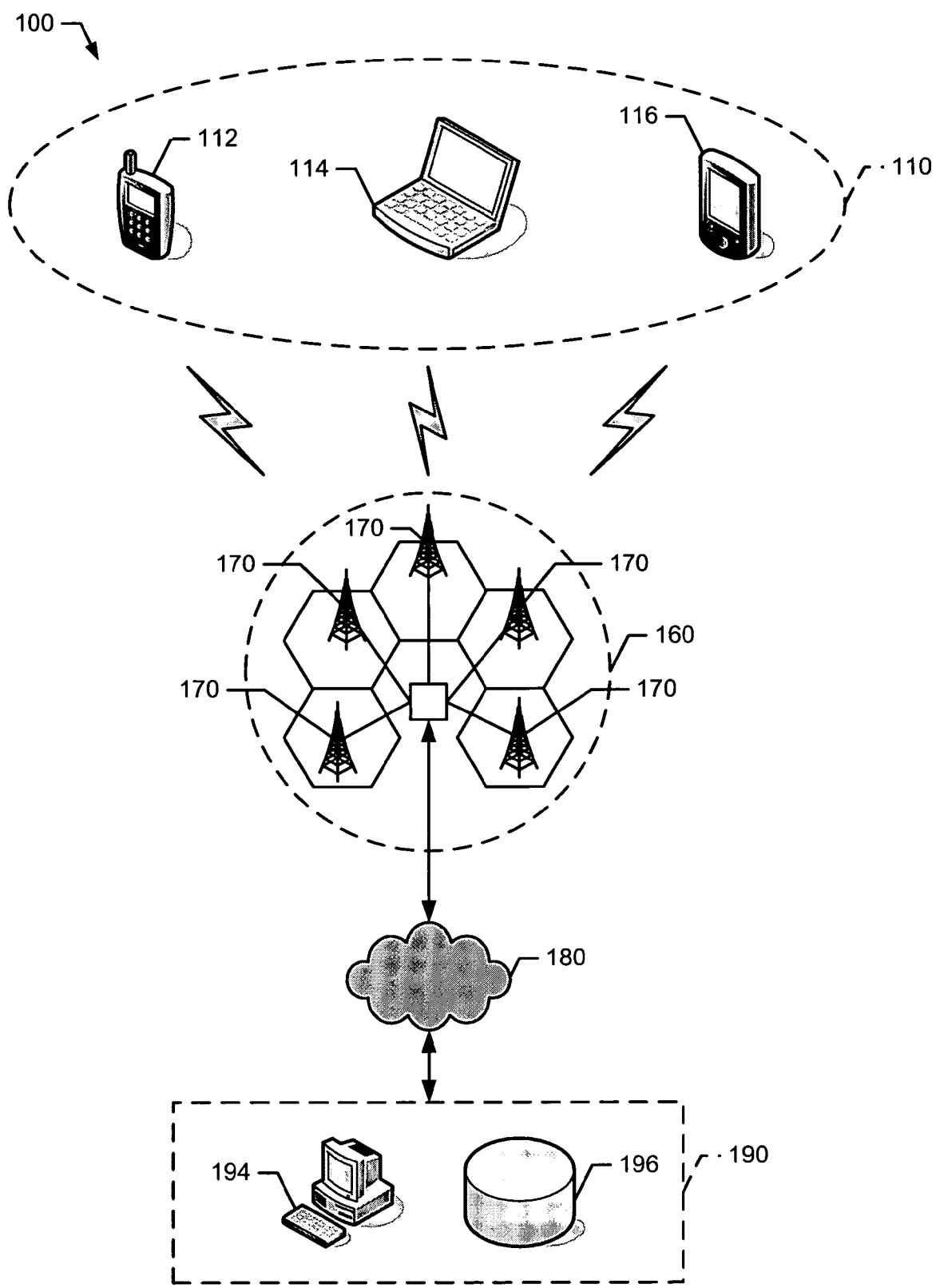
FIG. 1 is a schematic diagram representation of an example wireless communication system according to an embodiment of the methods and apparatus disclosed herein.

Referring to FIG. 1, an example wireless communication system 100 is described herein. In one example, the wireless communication system 100 may include one or more mobile BWA networks (e.g., one shown as 200 in FIG. 2). Although FIG. 1 depicts a mobile BWA network, the wireless communication system 100 may include more mobile BWA networks. Further, the wireless communication system 100 may include one or more fixed BWA networks (not shown). The methods and apparatus described herein are not limited in this regard.

In particular, the wireless communication system 100 may include one or more mobile subscriber stations (MSS) 110, generally shown as 112, 114, and 116. For example, the MSS 110 may be a laptop computer, a handheld computer, a tablet computer, a cellular telephone (e.g., a smart phone), a pager, an audio and/or video player (e.g., an MP3 player or a DVD player), a game device, a digital camera, a navigation device (e.g., a GPS device), and/or other suitable portable electronic devices. Although FIG. 1 depicts three MSS, the wireless communication system 100 may include more or less MSS.

The MSS 110 may use a variety of modulation techniques such as time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless communication links. For example, the laptop computer 114 may implement OFDM modulation to transmit large amounts of digital data by splitting a radio frequency signal into multiple small sub-signals, which in turn, are transmitted simultaneously at different frequencies. In particular, the MSS 110 may use OFDM modulation as described in the 802.xx family of standards developed by the Institute of Electrical and Electronic Engineers (IEEE) and/or variations and evolutions of these standards (e.g., 802.11x, 802.15, 802.16x, etc.). The MSS 110 may also operate in accordance with other suitable wireless communication protocols that require very low power such as Bluetooth, Ultra Wideband (UWB), and/or radio frequency identification (RFID) to communicate via wireless communication links. The methods and apparatus described herein are not limited in this regard.

The wireless communication system 100 may also include one or more radio access networks (RAN), generally shown as 160. Each RAN 160 may include one or more base stations (BS), generally shown as 170, and other radio components necessary to provide communication services to the MSS 110. The BS 170 may operate in accordance with the applicable standard(s) for providing wireless communication services to the MSS 110. That is, each BS 170 may be configured to operate in accordance with one or more of several wireless communication protocols to communicate with the MSS 110. In particular, these wireless communication protocols may be based on analog, digital, and/or dual-mode communication system standards such as the Global System for Mobile Communications (GSM) standard, the Frequency Division Multiple Access (FDMA) standard, the Time Division Multiple Access (TDMA) standard, the Code Division Multiple Access (CDMA) standard, the Wideband CDMA (WCDMA) standard, the General Packet Radio Services (GPRS) standard, the Enhanced Data GSM Environment (EDGE) standard, the Universal Mobile Telecommunications System (UMTS) standard, variations and evolutions of these standards, and/or other suitable wireless communication standards. Although FIG. 1 depicts one RAN, the wireless communication system 100 may include more RAN.

In addition, the wireless communication system 100 may include an Internet protocol (IP) transport 180 and a network management system (NMS) 190. The IP transport 180 may provide one or more IP connections between the RAN 160 and the NMS 190. As described in detail below, the NMS 190 may include an element management system 194 and a service database 196.

Further, the wireless communication system 100 may include other wireless local area network (WLAN) devices and/or wireless wide area network (WWAN) devices (not shown) such as network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
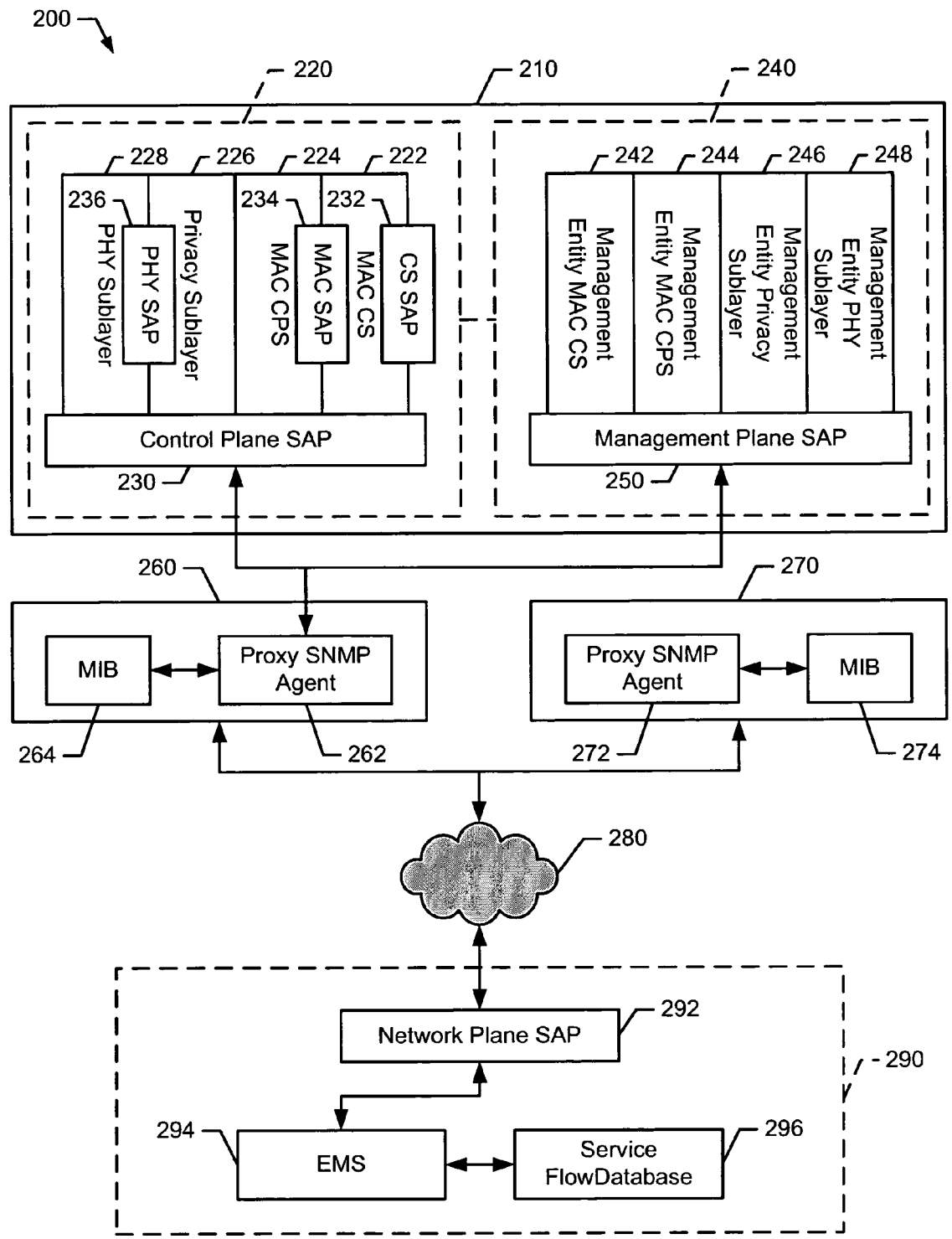
FIG. 2 is a block diagram representation of an example mobile broadband wireless access (BWA) network of the example wireless communication system of FIG. 1.

In the example of FIG. 2, a mobile broadband wireless access (BWA) network 200 may include one or more mobile subscriber stations (MSS), generally shown as 210, and one or more base stations (BS), generally shown as 260 and 270. The mobile BWA system 200 may also include an Internet protocol (IP) transport 280 and a network management system (NMS) 290. Although FIG. 2 depicts one MSS, the mobile BWA network 200 may include more MSS. Further, while FIG. 2 depicts two BS, the mobile BWA network 200 may include more BS.

The MSS 210 may include a control plane 220 and a management plane 240. The control plane 220 may include one or more media access (MAC) sublayers. In particular, the MAC sublayers may include a MAC convergence sublayer (CS) 222, a MAC common part sublayer (CPS) 224, and a privacy sublayer 226. The control plane 220 may also include a physical (PHY) sublayer 228 to support electrical and/or mechanical interfaces to a physical medium. Further, the control plane 220 may include a control plane service access point (SAP) 230, a CS SAP 232, a MAC SAP 234, and a PHY SAP 236.

The MAC CS 222 may provide transformation and/or mapping of external network data received through the CS SAP 232. The MAC CPS 224 may provide core MAC functionality of system access, bandwidth allocation, connection establishment, and/or connection maintenance. The MAC CPS 224 may receive data corresponding to particular MAC connections from the MAC CS 222 via the MAC SAP 234. The privacy sublayer 226 may provide authentication, secure key exchange, and/or encryption. Data, PHY control, and/or statistics may be transferred between the MAC CPS 224 and the PHY sublayer 228 via the PHY SAP 236.

The management plane 240 may include a management entity MAC CS 242, a management entity MAC CPS 244, a management entity privacy sublayer 246, and a management entity PHY sublayer 248. The components of the management plane 240 may be configured to manage the MAC sublayers of the control plane 220. In particular, the management entity MAC CS 242 may be configured to manage the MAC CS 222. The management entity MAC CPS 244 may be configured manage the MAC CPS 224. The management entity privacy sublayer 246 may be configured to manage the privacy sublayer 226. The management entity PHY sublayer 248 may be configured to manage the PHY sublayer 228. Further, the management plane 240 may include a management plane SAP 250. The management plane SAP 250 may be configured to manage the control plane SAP 230, the CS SAP 232, the MAC SAP 234, and/or the PHY SAP 236 of the control plane 220.

Each of the BS 260 and 270 may include a proxy simple network management protocol (SNMP) agent, generally shown as 262 and 272, respectively. The proxy SNMP agents 262 and 272 may manage the MSS 210 via the control plane SAP 230 and the management plane SAP 250. Each of the BS 260 and 270 may also include a management information base (MIB), generally shown as 264 and 274, respectively. Each of the MIB 264 and 274 may be a database to store information and statistics on each network element in a network. The information and statistics stored in the MIB 264 and 274 may be used to keep track of the performance of each network element and to ensure that the network elements of the mobile BWA network 200 are functioning properly.

The NMS 290 may include a network plane SAP 292, an element management system (EMS) 294, and a service flow database 296. As described in detail below, the EMS 294 may manage network elements associated with the mobile BWA network 200 such as the MSS 210 and the BS 260 and 270. The EMS 294 may manage the BS 260 and 270 via the network plane SAP 292 based on a SNMP. The EMS 294 may also manage the MSS 210 via the network plane SAP 292. In particular, the EMS 294 may use the proxy SNMP agents 262 and 272 at the BS 260 and 270, respectively, to retrieve parameters located in the MSS 210 from control and management MAC messages. For example, control MAC messages may include uplink channel descriptor (UCD), downlink channel descriptor (DCD), registration request (REG-REQ), and/or registration response (REG-RSP) as described in the 802.16 standard developed by the Institute of Electrical and Electronic Engineers (IEEE) (e.g., the IEEE std. 802.16, published 2004). The management MAC messages may include new messages to support back-end proxy model (e.g., the IEEE std. 802.16g).

The service flow database 296 may store service flow context associated with the mobile BWA network 200. For example, the service flow context may include service flow, quality of service, and/or classifier parameters provided by service providers of communication services. The service flow context may also include packet counters, traps, and/or events reported by the network elements.

In the mobile BWA network 200, the MSS 210 may be dynamically associated with one or more BS (e.g., the MSS 210 may not be fixed to one particular BS). For example, the MSS 210 may move to one coverage area to another. As a result, a handoff (e.g., a transition) from one BS to another BS may be required to maintain communication services for the MSS 210. The methods and apparatus described herein are not limited in this regard.

Figures 3, 4:
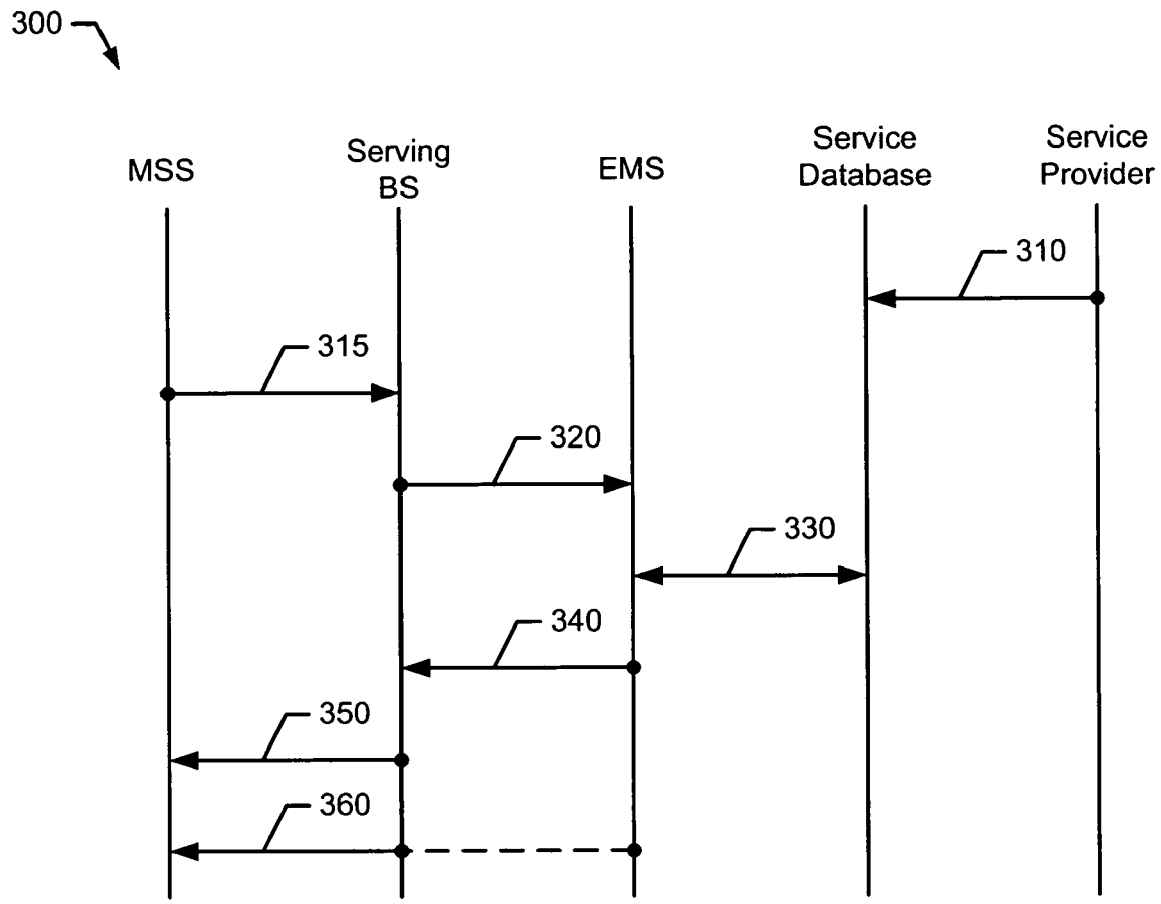
FIG. 3 is a sequence diagram representation of one manner in which the example mobile BWA network of FIG. 2 may be implemented.
FIG. 4 depicts an example of a registration interrupt that may be used to implement the example mobile BWA network of FIG. 2.

Turning to FIG. 3, for example, service flow context associated with the MSS 210 may be transferred when the MSS 210 initiate registration. In particular, a service provider (e.g., via a server) may activate service for a subscriber using the MSS 210 by providing the service flow context to the service flow database 296 (310). Alternatively, a handoff without pre-notification may proceed without the service provider providing the service flow context to the service flow database 296 as mentioned in connection with 310 because the service flow context may be previously stored in the service flow database 296. The MSS 210 may register with the serving BS 260 (315). Accordingly, the serving BS 260 may transmit a registration interrupt to the EMS 294 (320). In particular, the registration interrupt may include the MAC address of the MSS 210. For example, the serving BS 260 may send an SNMP trap 400 as shown in FIG. 4 to the EMS 294.

Referring back to FIG. 3, the EMS 294 may identify the service flow context from the service flow database 296 based on the MAC address of the MSS 210 (330). Accordingly, the EMS 294 may send an SNMP SET message to the serving BS 260 to download the service flow context to the serving BS 260 (340). The serving BS 260 may store the service flow context in the MIB 264. Based on the downloaded service flow context, the serving BS 260 may transmit a dynamic service addition (DSA) message to establish connection with the MSS 210 (350). Accordingly, the proxy SNMP agent 262 may include MSS and BS objects manageable by the EMS 294. To retrieve parameters from the MSS 210, the SNMP agent 262 may convert SNMP messages from the EMS 294 into MAC messages to the MSS 210. As a result, the EMS 294 may manage the MSS 210 via the proxy SNMP agent 262 associated with the serving BS 260 (360). The methods and apparatus described herein are not limited in this regard.

Figures 5, 6:
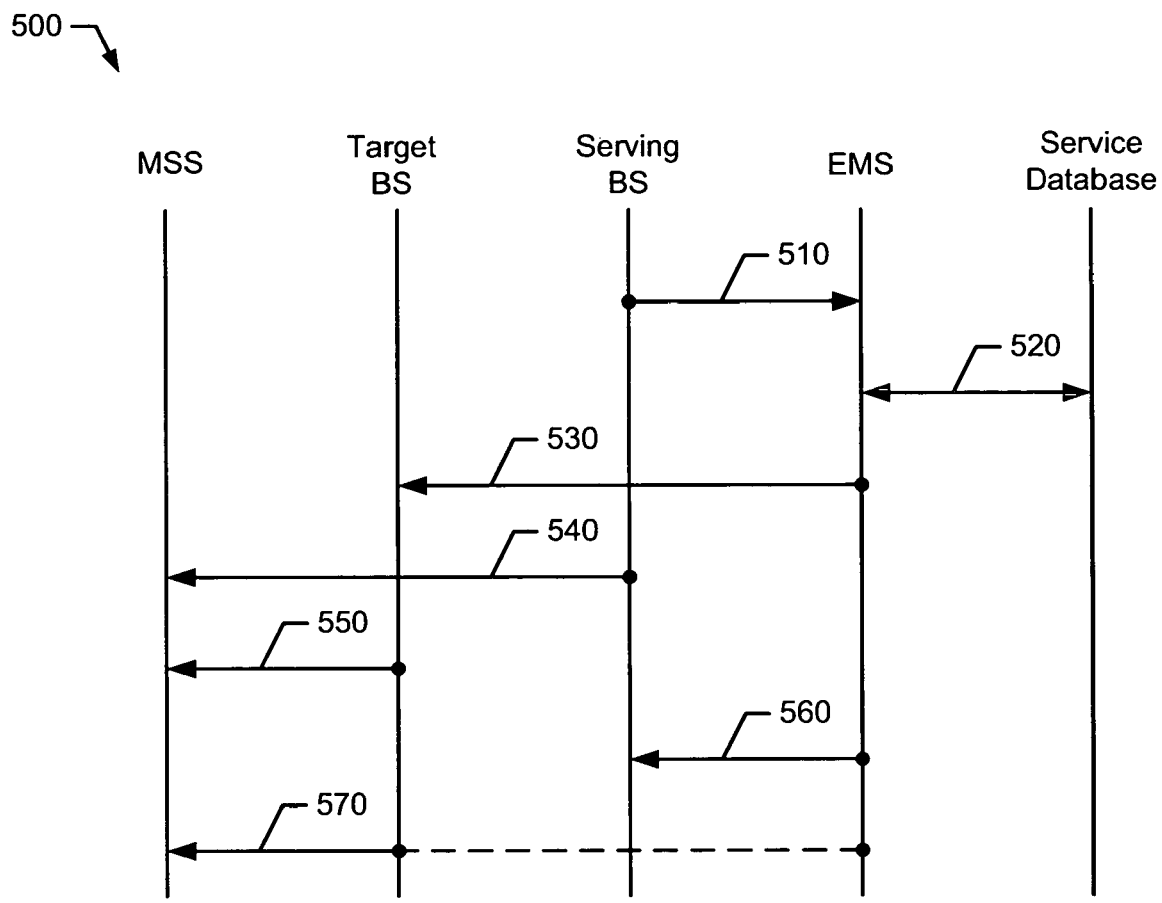
FIG. 5 is a sequence diagram representation of another manner in which the example mobile BWA network of FIG. 2 may be implemented.
FIG. 6 depicts an example of a handoff interrupt that may be used to implement the example mobile BWA network of FIG. 2.

In another example, the EMS 294 may also transfer service flow context when a BS such as the serving BS 260 initiates a handoff request. In the example of FIG. 5, the serving BS 260 may initiate a handoff process in response to a trigger event. For example, the EMS 294 may request the serving BS 260 to release the MSS 210 to another BS to optimize performance (e.g., load balancing). Accordingly, the serving BS 260 may transmit a handoff interrupt (e.g., an SNMP trap) to the EMS 294 (510). The handoff interrupt may include the MAC address of the MSS 210 and a target BS identifier of the target BS 270. In one example, the interrupt may be an SNMP trap 600 as shown in FIG. 6 to the EMS 294.

Turning back to FIG. 5, the EMS 294 may identify the service flow context from the service flow database 296 based on the MAC address of the MSS 210 (520). The EMS 294 may also identify the target BS 270 based on the target BS ID. Accordingly, the EMS 294 may send an SNMP SET message to the target BS 270 to download the service flow context to the target BS 270 (530). The target BS 270 may store the service flow context in the MIB 274. To request the MSS 210 to handoff to the target BS 270, the serving BS 260 may send a BS handoff request message (e.g., MOB-BSHO-REQ message of the IEEE 802.16 std.) to the MSS 210 (540).

The MSS 210 may complete a ranging and registration process to handoff to the target BS 270. As mentioned above (e.g., 530), the target BS 270 may have downloaded and locally stored the service flow context from the EMS 294. Based on the downloaded service flow context, the target BS 270 may transmit a DSA message to establish connection with the MSS 210 (550). Further, the EMS 294 may remove the service flow context locally stored in the MIB 264 at the serving BS 260 (560). Accordingly, the proxy SNMP agent 272 may include MSS and BS objects manageable by the EMS 294. To retrieve parameters from the MSS 210, the SNMP agent 272 may convert SNMP messages from the EMS 294 into MAC messages to the MSS 210. As a result, the EMS 294 may manage the MSS 210 via the proxy SNMP agent 272 associated with the target BS 270 (570). The methods and apparatus described herein are not limited in this regard.

Figure 7:
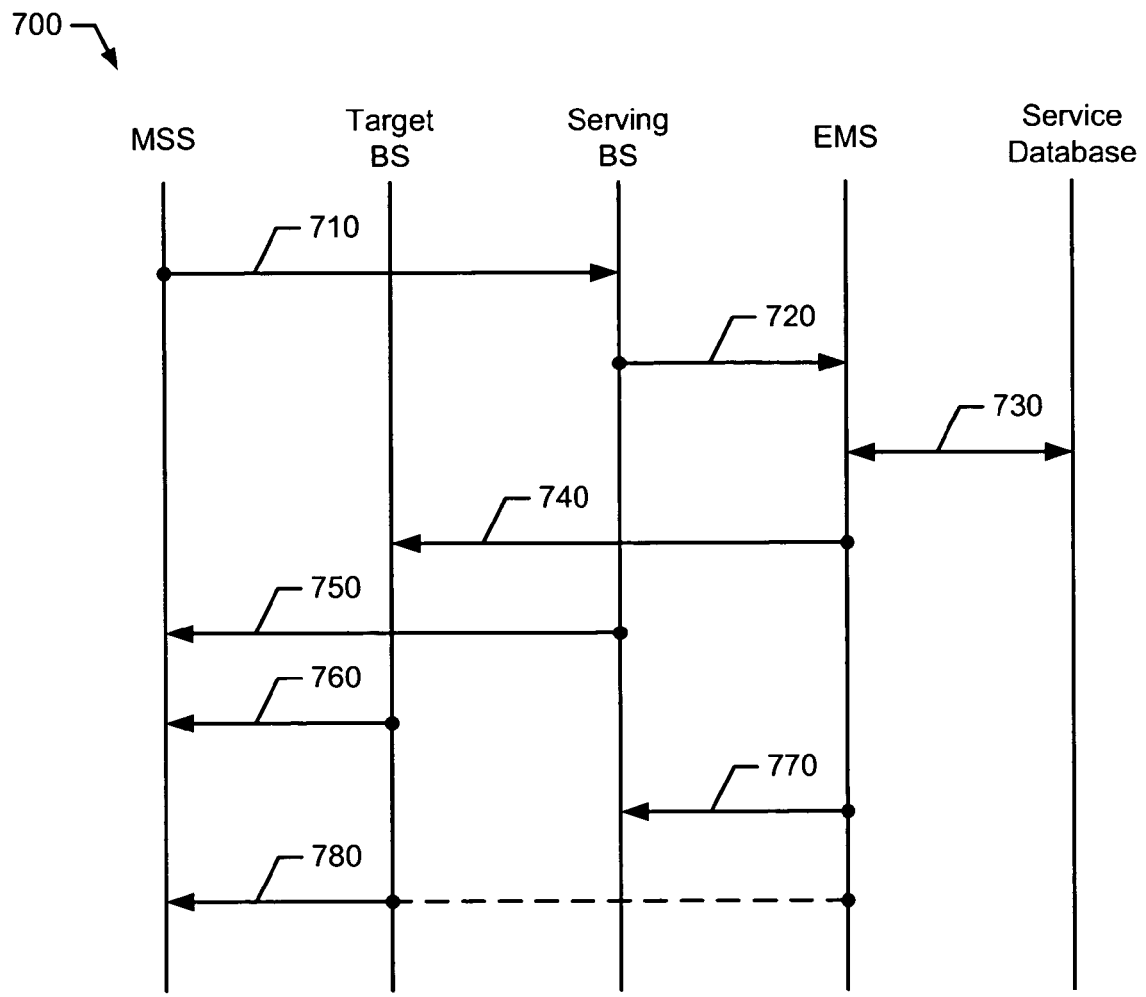
FIG. 7 is a sequence diagram representation of yet another manner in which the example mobile BWA network of FIG. 2 may be implemented.

In yet another example, the EMS 294 may transfer service flow context when the MSS 210 initiates a handoff request. Referring to FIG. 7, for example, the MSS 210 may select the target BS 270 as a target for a handoff. To request the handoff to the target BS 270, The MSS 210 may send a MS handoff request message (e.g., MOB-MSSHO-REQ message of the IEEE 802.16 std.) to the serving BS 260 (710). Accordingly, the serving BS 260 may transmit a handoff interrupt (e.g., an SNMP trap) to the EMS 294 (720). The handoff interrupt may include the MAC address of the MSS 210 and the target BS ID of the target BS 270. In one example, the handoff interrupt may be an SNMP trap 600 as shown in FIG. 6 to the EMS 294.

Referring back to FIG. 7, the EMS 294 may identify the service flow context from the service flow database 296 based on the MAC address of the MSS 210 (730). The EMS 294 may also identify the target BS 270 based on the target BS ID. Accordingly, the EMS 294 may send an SNMP SET message to the target BS 270 to download the service flow context to the target BS 270 (740). The target BS 270 may store the service flow context in the MIB 274.

To indicate completion of the service flow context transfer, the serving BS 260 may send a BS handoff response message (e.g., MOB-BSHO-RSP message of the IEEE 802.16 std.) to the MSS 210 (750). The MSS 210 may complete a ranging and registration process to handoff to the target BS 270. As mentioned above (e.g., 740), the target BS 270 may have downloaded and locally stored the service flow context from the EMS 294. Based on the downloaded service flow context, the target BS 270 may transmit a DSA message to establish connection with the MSS 210 (760). Further, the EMS 294 may remove the service flow context locally stored in the MIB 264 at the serving BS 260 (770). Accordingly, the proxy SNMP agent 272 may include MSS and BS objects manageable by the EMS 294. To retrieve parameters from the MSS 210, the SNMP agent 272 may convert SNMP messages from the EMS 294 into MAC messages to the MSS 210. As a result, the EMS 294 may manage the MSS 210 via the proxy SNMP agent 272 associated with the target BS 270 (780). The methods and apparatus described herein are not limited in this regard.

Figure 8:
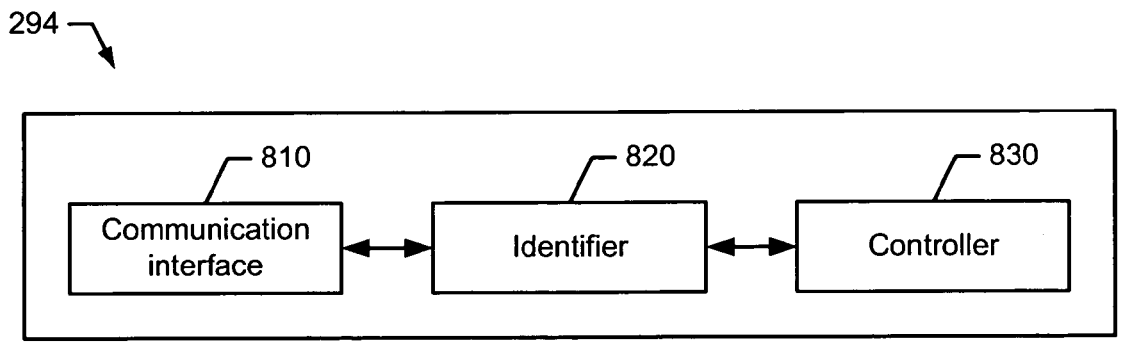
FIG. 8 is a block diagram representation of an example element management system of FIG. 2.
Figure 9:
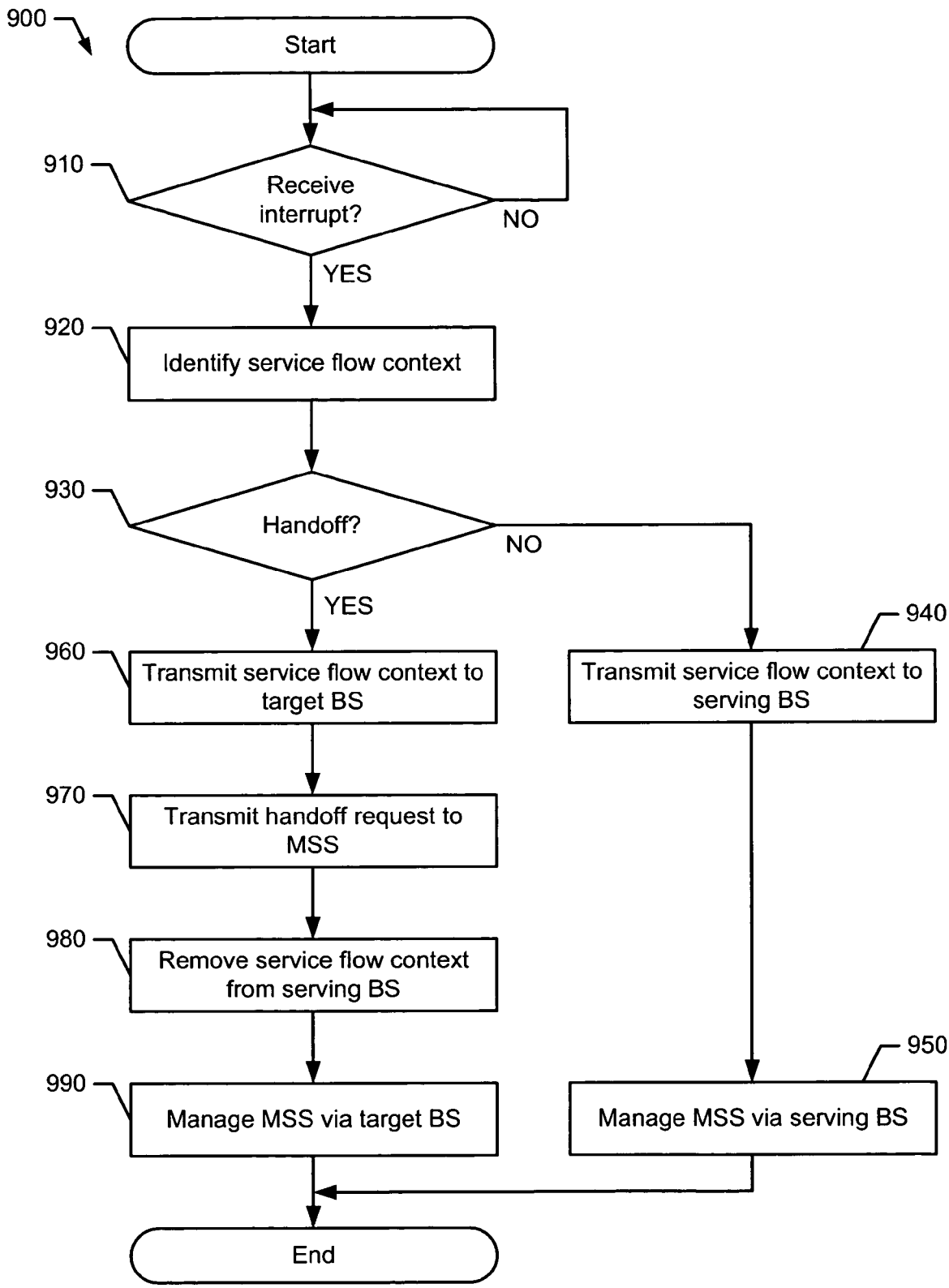
FIG. 9 is a flow diagram representation of one manner in which an example element management system of FIG. 8 may be configured to transfer service flow context.

In the example of FIG. 8, the EMS 294 may include a communication interface 810, an identifier 820, and a controller 830. As described in detail below, FIG. 9 depicts one manner in which the example EMS 294 of FIG. 8 may be configured to transfer service flow context. The example process 900 of FIG. 9 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 9, these actions can be performed in other temporal sequences. Again, the example process 900 is merely provided and described in conjunction with the components of FIGS. 2 and 8 as an example of one way to configure the EMS 294 to transfer service flow context.

In the example of FIG. 9 the process 900 may begin with the EMS 294 (e.g., via the controller 830) monitoring for an interrupt for a registration or a handoff (e.g., an SNMP trap) (block 910). The interrupt may include an identifier of the MSS 210 associated with a registration or a handoff. For example, the identifier may be the MAC address of the MSS 210. If the EMS 294 fails to receive an interrupt via the communication interface 810, the EMS 294 may continue to monitor for an interrupt. Otherwise if the EMS 294 receives an interrupt, the EMS 294 (e.g., via the identifier 820) may identify service flow context from the service flow database 296 based on the MAC address of the MSS 210 (block 920).

The EMS 294 may determine whether the interrupt is associated with a handoff of the MSS 210 (block 930). If the interrupt is not associated with a handoff, the EMS 294 (e.g., via the communication interface 810) may download the service flow context to the serving BS 260 to provide communication services to the MSS 210 (block 940). For example, the EMS 294 may download the service flow context to the serving BS 260 when the MSS 210 initially registers for communication services as described in connection with FIG. 3. The EMS 294 may transmit the service flow context via an SNMP SET message. Accordingly, the serving BS 260 may transmit a DSA message to establish connection with the MSS 210. As a result, the EMS 294 (e.g., via the controller 830) may manage the MSS 210 via the proxy SNMP agent 262 associated with the serving BS 260 (block 950).

Referring back to block 930, if the interrupt is associated with a handoff, the EMS 294 may download the service flow context to the target BS 270 to provide communication services to the MSS 210 (block 960). The target BS 270 may store the service flow context in the MIB 274. In one example, the EMS 294 may download the service flow context to the target BS 270 when the serving BS 260 initiates a handoff request as described in connection with FIG. 5. In another example, the EMS 294 may also download the service flow context to the target BS 270 when the MSS 210 initiates a handoff request as described in connection with FIG. 7. The serving BS 260 may transmit a handoff request to the MSS 210 requesting the MSS 210 to handoff to the target BS 270 (block 970). The target BS 270 may transmit a DSA message to establish connection with the MSS 210. Accordingly, the EMS 294 may remove the service flow context locally stored in the MIB 264 at the serving BS 260 (block 980). The proxy SNMP agent 272 may access the MSS and BS objects manageable by the EMS 294 that are stored in the MIB 274. To retrieve parameters from the MSS 210, the SNMP agent 272 may convert SNMP messages from the EMS 294 into MAC messages to the MSS 210. As a result, the EMS 294 (e.g., via the controller 830) may manage the MSS 210 via the proxy SNMP agent 272 associated with the serving BS 270 (block 990). The methods and apparatus described herein are not limited in this regard.

Although the methods and apparatus disclosed herein are described with respect to mobile BWA networks, the methods and apparatus disclosed herein may be readily applicable to other types of BWA networks such as fixed BWA networks. Further, while the methods and apparatus disclosed herein are described with respect to BWA networks, the methods and apparatus disclosed herein may be applied to other suitable types of wireless communication networks. For example, the methods and apparatus disclosed herein may be applied to wireless personal area networks (WPANs), wireless local area networks (WLANs), wireless metropolitan area networks (WMANs), and/or wireless wide area networks (WWANs).

Figure 10:
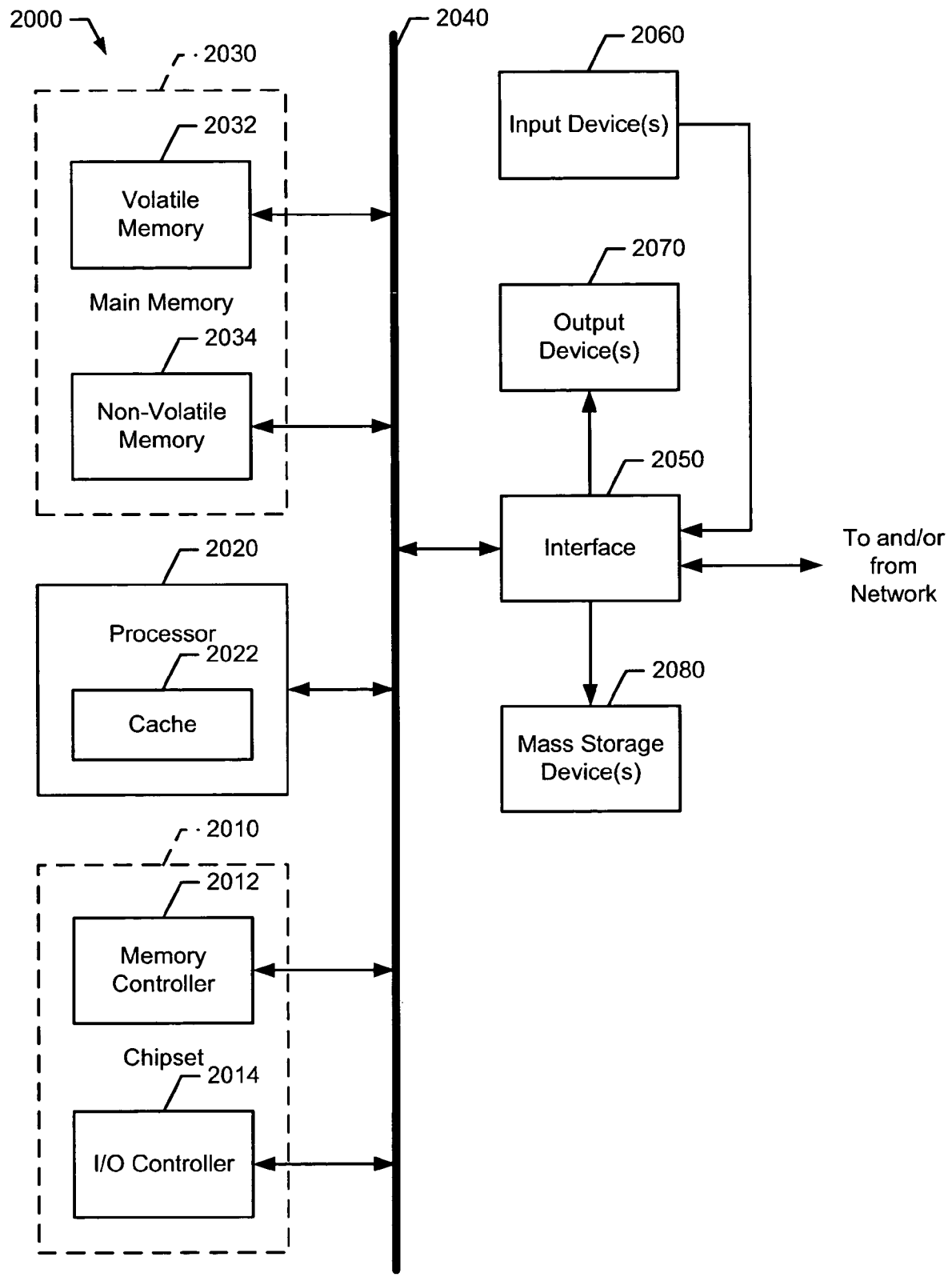
FIG. 10 is a block diagram representation of an example processor system that may be used to implement the example element management system of FIG. 8.

FIG. 10 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 10 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 10 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
provisioning, by an element management system (EMS) of a network management system (NMS), a service flow context associated with a subscriber in a service database, said provisioning of the service flow context to activate broadband services of a Worldwide Interoperability for Microwave Access (WiMax) network for the subscriber;
receiving, by the EMS, a first SNMP trap from an SNMP proxy on a serving base station, the first SNMP trap including a media access control (MAC) address of a mobile subscriber station (MSS) associated with the subscriber, to indicate the MSS has registered with the serving base station,
transmitting, by the EMS, a first SNMP set message, including the service flow context, to the serving base station to enable the serving base station to establish a connection with the MSS based on the service flow context;
receiving, by the EMS, a second SNMP trap from the SNMP proxy on the serving base station, the second SNMP trap including the MAC address of the MSS and a target base station identifier identifying a target base station to succeed in serving the established connection of the MSS;
identifying, by the EMS in the service database, the service flow context based on the MAC address of the MSS;
transmitting, by the EMS, a second SNMP set message, including the service flow context, to a proxy SNMP agent of the target base station remotely disposed from the NMS and the MSS to enable a transferring of the established connection to the target base station, transmitting, by the EMS, a message to the MSS through the serving base station, to indicate that the service flow context has been transmitted to the target base station to enable the MSS to register with the target base station, wherein the transmitting of the second SNMP set message is completed before the MSS registers with the target base station; and
retrieving, by the NMS in accordance with a simple network management protocol, parameters associated with the connection from the MSS to enable the NMS to manage the MSS, wherein the parameters are retrieved via the SNMP proxy of the target base station that converts commands from the first SNMP protocol to a second protocol, the SNMP protocol being incompatible with the MSS.

2. A method as defined in claim 1, wherein identifying by the NMS the service flow context associated with the mobile subscriber station remotely disposed from the NMS comprises identifying by the NMS service flow context associated with a mobile subscriber station of a mobile broadband wireless access network.

3. A method as defined in claim 1, further comprising transmitting by the NMS a handoff request to the MSS through the proxy agent of the serving base station remotely disposed from the NMS and the MSS, the serving base station currently serving the mobile subscriber station, wherein the handoff request is transmitted to perform load balancing.

4. A method as defined in claim 1, further comprising removing the service flow context from a management information base (MIB) of the serving base station remotely disposed from the NMS and the mobile subscriber station after handoff to the target base station.

5. An article of manufacture including a proxy agent designed to enable a machine to:
transmit a first SNMP trap to an element management system (EMS) of a network management system (NMS), wherein the first SNMP trap includes a media access control (MAC) address of a mobile subscriber station (MSS) associated with a subscriber to indicate that the MSS has registered with the machine;
receive, from the NMS remotely disposed from the machine an SNMP set message including an identified service flow context including quality of service parameters associated with a mobile subscriber station (MSS) remotely disposed from the NMS and the machine, the service flow context being identified by a media access control (MAC) address of the MSS and configured to facilitate provision of broadband services of a Worldwide Interoperability for Microwave Access (WiMax) network to the MSS;
store the service flow context in a management information base (MIB) at the machine, wherein the MIB is accessible by the NMS;
transmit a message to the MSS in accordance with a second network protocol to establish a connection with the MSS, wherein the message is based at least on the service flow context stored in the MIB to enable the MSS to establish a connection with the based on the service flow context;

convert, by the proxy agent, another SNMP command received from the NMS to another command in accordance with the second network protocol to retrieve parameters from the mobile subscriber station to enable the NMS to manage the MSS;

transmit a second SNMP trap to the NMS including t e MAC address of the MSS and a target base station identifier indentifying a target base stat on to succeed in servicing the established connection of the MSS.

6. An article of manufacture as defined in claim 5, wherein the proxy agent further enables the machine to provide a registration interrupt to the NMS, and the received service flow context is provided to the machine by the NMS in response to receipt by the NMS the registration interrupt.

7. An article of manufacture as defined in claim 5, wherein the received service flow context is provided by the NMS to the machine in response to receipt by the NMS a handoff interrupt from another machine.

8. An article of manufacture as defined in claim 5, wherein the proxy agent further enables the machine to transmit a handoff request to the mobile subscriber station.

9. An apparatus comprising:
 a communication interface to couple the apparatus to a network; and
 a controller coupled to the communication interface configured to:
  provision service flow context associated with a subscriber in a service database, wherein the service flow context is configured to facilitate activation of broadband services of a Worldwide Interoperability for Microwave Access (WiMax) network for the subscriber;
  receive a first SNMP trap from an SNMP proxy agent on a serving base station, the first SNMP trap including a media access control (MAC) address of a mobile subscriber station (MSS) associated with the subscriber, to indicate the MSS has registered with the serving base station;
  transmit a first SNMP set message including the service flow context to the serving base station to enable the sewing base station to establish a connection with the MSS based on the service flow context;
  receive a second SNMP trap from the SNMP proxy agenton the wherein the second SNMP trap includes the MAC address of the MSS and a target base station identifier indentifying a target base station to succeed in serving the established connection of the MSS;
  identify in the service database the service flow context a based on the MAC address of the MSS;
  transmit a second SNMP set message including the identified service flow context through the communication interface to a management information base (MIB) of the target base station remotely disposed from the apparatus and the mobile subscriber station to enable a transferring of the established connection to the target base station;
  transmit a message to the MSS through the serving base station, to indicate that the service flow context has been transmitted to the target base station to enable the MSS to register with the target base station, wherein the transmitting of the second SNMP set message is completed before the MSS registers with the target base station; and
  retrieve, in accordance with a simple network management protocol, parameters located in the MSS to enable the management of the MSS, wherein the parameters are retrieved via another proxy agent disposed on the target base station that converts commands from the simple network management protocol to a second protocol, the simple network management protocol being incompatible with the MSS.

10. An apparatus as defined in claim 9, wherein the controller is configured to transmit a handoff request to the MSS through the proxy agent of the base station, wherein the handoff request is transmitted to perform load balancing.

11. An apparatus as defined in claim 9, wherein the controller is further configured to remove the service flow context from the serving base station after the target base station has succeeded in serving the MSS.

12. A system comprising:
 a serving base station having a proxy agent disposed thereon; and
 a network management system (NMS) remotely disposed from and communicatively coupled to the base station and configured to:
  provision a service flow context associated with a subscriber in a service database, wherein the service flow context is configured to facilitate activation of broadband of a Worldwide Interoperability for Microwave Access (WiMax) network for the subscriber;
  receive a first SNMP trap in accordance wit an SNMP protocol from the proxy agent, the first SNMP trap including a media access control (MAC) address of the mobile subscriber station (MSS) associated with the subscriber to indicate that the MSS has registered with the serving base station;
  transmit a first SNMP set message, including the service flow context, to the serving base station to enable the MSS to establish a connection with the MSS based on the service flow context;
  receive a second SNMP trap from the proxy agent on the serving base station the second SNMP trap including the MAC address of the MSS and a target base station identifier indentifying a target base station to succeed in serving the established connection of the MSS:
  identify in ther service flow database, the service flow context based on the MAC address of the MSS;
  transmit a second SNMP set message, including the service flow context, to a proxy agent of the target base station to enable a transferring of the established connection to the target base station;
  transmit a message to the MSS through the sewing base station to indicate that the service flow context has been transmitted to the target base station to enable the MSS to register with the target base station, wherein the second SNMP set message is completed before the MSS registers with the target base station; and
  retrieve, in accordance with the simple networm management protocol, parameters located in the MSS, to enable the management of the MSS, wherein the parameters are retrieved via the proxy agent disposed on the target base station that converts commands from the simple network management protocol to a second network protocol, the simple network management protocol being incompable with the MSS.

13. A system as defined in claim 12, wherein the NMS is configured to transmit a handoff request to MSS through the proxy agent of the serving base station, wherein the handoff request is transmitted to perform load balancing.

14. A system as defined in claim 12, wherein the NMS is configured to remove the service flow context from the serving base station.

* * * * *

UNITED STATES PATENT AND TRADEMARK OFFICE
CERTIFICATE OF CORRECTION

PATENT NO.         : 7,693,513 B2                                                       Page 1 of 1
APPLICATION NO.    : 11/038752
DATED              : April 6, 2010
INVENTOR(S)        : Joey Chou It is certified that error appears in the above-identified patent and that said Letters Patent is hereby corrected as shown below:

In claim 1, col. 9, line 56, "serving base station," should read --serving base station;--;
In claim 1, col. 10, line 7, "target base station," should read --target base station;--;
In claim 1, col. 10, lines 7-8, "target base station, transmitting," should read --target base station, [new line] transmitting,--;
In claim 1, col. 10, line 20, "the first SNMP protocol" should read --the SNMP protocol--;

In claim 5, col. 11, lines 6-7, "t e MAC address" should read --the MAC address--;
In claim 5, col. 11, line 8, "a target base stat on" should read --a target base station--;

In claim 9, col. 11, lines 39-40, "the sewing base station" should read --the serving base station--;
In claim 9, col. 11, lines 42-43, "from the SNMP proxy agenton the wherein the second SNMP trap includes"
should read --from the SNMP proxy agent, wherein the second SNMP trap includes--;
In claim 9, col. 11, lines 47-48, "the service flow context a based on" should read --the service flow context based on--;

In claim 12, col. 12, lines 21-22, "of broadband of" should read --of broadband services of--;
In claim 12, col. 12, line 24, "wit an SNMP" should read --with an SNMP--;
In claim 12, col. 12, line 38, "in ther service flow database," should read --in the service flow database,--;
In claim 12, col. 12, lines 43-44, "the sewing base station" should read --the serving base station--;
In claim 12, col. 12, lines 50-51, "the simple networm management protocol," should read --the simple network management protocol,--; and
In claim 12, col. 12, line 57, "being incompable with the MSS." should read --being incompatible with the MSS.--.

Signed and Sealed this
Seventeenth Day of January, 2012

David J. Kappos
*Director of the United States Patent and Trademark Office*